United States Patent [19]

Foggini

[11] Patent Number: 4,533,275
[45] Date of Patent: Aug. 6, 1985

[54] SWIVEL CONNECTOR FOR SECURING MOTORVEHICLE SUN VISORS

[75] Inventor: Giovanni Foggini, Turin, Italy

[73] Assignee: Lear S.n.c., Orbassano, Italy

[21] Appl. No.: 278,240

[22] Filed: Jun. 29, 1981

[30] Foreign Application Priority Data

Jul. 16, 1980 [IT] Italy ............................ 68131 A/80

[51] Int. Cl.³ .............................................. F16D 1/12
[52] U.S. Cl. ...................................... 403/165; 403/71; 296/97 K
[58] Field of Search .................. 403/71, 165, 163, 161; 296/97 K; 248/289.1

[56] References Cited

U.S. PATENT DOCUMENTS

| 2,057,009 | 10/1936 | Chadwick | 296/97 K |
| 2,237,700 | 4/1941 | Goldman | 296/97 K |
| 4,181,337 | 1/1980 | Muller | |

FOREIGN PATENT DOCUMENTS

| 61852 | 5/1975 | Australia | 296/97 K |
| 2816658 | 10/1979 | Fed. Rep. of Germany | 296/97 K |
| 597987 | 9/1959 | Italy | 403/161 |

Primary Examiner—Andrew V. Kundrat
Attorney, Agent, or Firm—Guido Modiano; Albert Josif

[57] ABSTRACT

The connector comprises a base of acetalic resin and a metal pivot pin connected together for mutual rotation under the braking effect of a frictional couple; the pivot pin being force fitted into a corresponding seat in the base and the ratio of the coupling axial extension to the pin diameter being no less than 4:1.

1 Claim, 2 Drawing Figures

SWIVEL CONNECTOR FOR SECURING MOTORVEHICLE SUN VISORS

BACKGROUND OF THE INVENTION

This invention relates to a swivel connector for securing motorvehicle sun visors, and more specifically, to a connector of a type suitable to permit the visor to be swung sideways to cut off the sun rays incident on a vehicle side window.

Swivels of that type are required to exert a certain friction couple on the visor pivot pin, which can last with time and is adapted to ensure a stable retention of the sun visor in a swung out position. In general, a friction couple in the 1 to 2 mN is required. This is accomplished, in conventional swivel connectors, through complicate and expansive structures which generally include an elastic means in the form of compression springs effective to force the pivot pin, itself of tapered configuration, into a correspondingly tapered seat of the connector.

The complicate construction results in a high manufacturing cost of the connector, while the swivel is more liable to wear and jamming.

This invention is based on the surprising finding that a constant with time, frictional couple can be applied by the base of the swivel directly to the pivot pin if the material of the base and dimensions of the pivot pin are suitably selected.

SUMMARY OF THE INVENTION

Thus, the task of the invention is to provide a structurally simple and low cost swivel connector for securing motorvehicle sun visors, which is effective to provide a time constant frictional braking couple on its pivot pin.

According to one aspect of the present invention this task is achieved by a swivel connector for securing motorvehicle sun visors, comprising a base and a pivot pin connected together for mutual rotation under the braking effect of a frictional couple, characterized in that the pivot pin is made of metal and simply force fitted into a seat in the synthetic resin base, and in that the ratio of the axial extension of the base-pin coupling to the pin diameter is equal to or greater than 4:1, an interference fit being provided between the pin and seat in the base in the 0.3 to 0.4 millimeter range.

BRIEF DESCRIPTION OF THE DRAWING

The invention will be more clearly understood from the detailed description which follows in conjunction with the accompanying drawings, given herein by way of example and not of limitation, and where.

DESCRIPTION OF THE PREFERRED EMBODIMENTS

Figure 1:
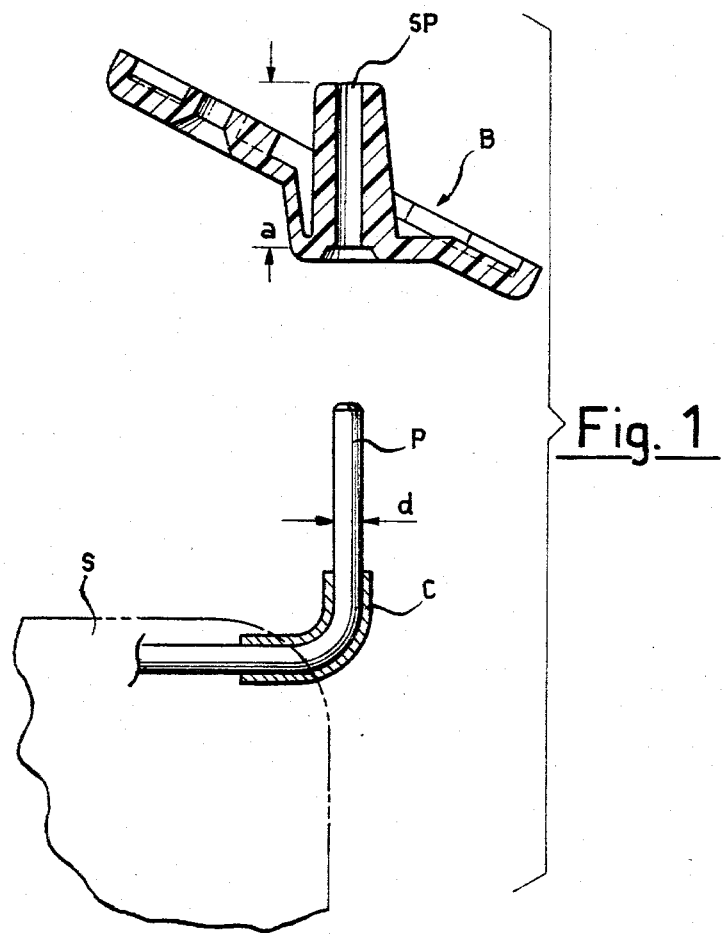
FIG. 1 is an exploded axial section view of the swivel connector according to the invention.
Figure 2:
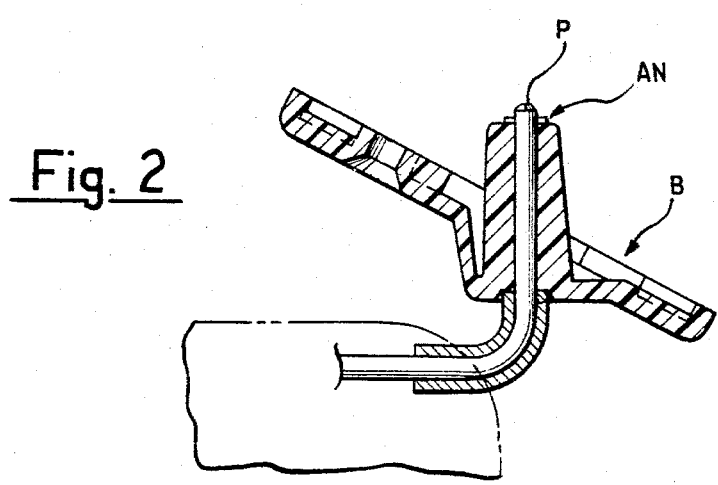
FIG. 2 is a similar axial section view showing the connector in its assembled condition.

In the drawing figures, the reference character B designates the base, and P designates the swivel pin as formed, by bending to a right angle, at the end of a wire piece whereto the sun visor S is articulated, the pin being bordered at the bottom by a sleeve C of an elastomeric material. As visible from FIG. 2 the sleeve C engages with its upper extremity an undercut provided in the base B at the lower end of the sea SP. The base B, which is preferably molded from acetalic resin, is formed with a cylindrical seat or socket SP, which may be, as an alternative, substantially cylindrical with just a slight mold withdrawal taper and is adapted for accommodating the pin P therein; the average diameter of said seat being smaller than the average diameter of the pin by approximately 0.3 mm, thereby a corresponding interference fit is achieved between the pin and seat.

The rotary coupling is accomplished by simply force fitting the pin against said interference, and the arrangement is such that the required friction couple by the base on the pin is achieved when, according to the invention, the ratio of the axial extension a of the coupling—that is the axial extension of the seat SP—to the diameter d of the pin P is no less than 4.5:1.

By selecting an axial extension e of the seat SP equal to 25 mm and a diameter of 4.5 mm for the pin P, a friction couple is developed which is equal to 1.5 mN and remains substantially constant under the following test conditions:

thermal cycling over 24 hours at +105° C. followed by 24 hours at −30° C.;

stress cycling at 25,000 oscillations with an angular amplitude of 90°—at the rate of one cycle every 30 seconds—working time 3 seconds—rest time 27 seconds—residual couple 1.2 mN.

Advantageously, for retention purposes against axial sliding, the end of the pin P is made through-going relatively to the seat SP, and has a retainer ring AN of the type for non-grooved shafts.

Of course, within the same principle, the construction details and embodiment shapes of the invention may be amply varied from the foregoing description and exemplary illustration without departing from the invention scope.

I claim:

1. A swivel connector for securing motorvehicle sun visors, comprising a base and a pivot pin connected together for mutual rotation under the braking effect of a frictional couple, characterized in that the pivot pin has a smooth cylindrical surface and is made of metal and simply force fitted into a seat in the synthetic resin base, and in that the ratio of the axial extension of the base-pin coupling to the pin diameter is equal to or greater than 4:1, an interference fit being provided between the pin and seat in the base in the 0.3 to 0.4 millimeter range and wherein the pivot pin has a smooth pivot pin proper portion and an extension thereof at an angle to the pivot pin proper and connected with the sun visor, said extension having along a length thereof a sleeve of elastometic material covering at least part of said extension, said sleeve having a portion extending over part of said pivot pin proper, said base having an undercut at the end of said seat facing said extension and said sleeve having its extremity facing said end of said seat in engagement of said undercut.

* * * * *